United States Patent
Goto et al.

(10) Patent No.: US 11,695,117 B2
(45) Date of Patent: Jul. 4, 2023

(54) NON-AQUEOUS ELECTROLYTE SECONDARY BATTERY

(71) Applicant: Panasonic Intellectual Property Management Co., Ltd., Osaka (JP)

(72) Inventors: Natsumi Goto, Hyogo (JP); Masanori Sugimori, Hyogo (JP); Yasunori Baba, Hyogo (JP); Katsunori Yanagida, Hyogo (JP); Nobuhiro Hirano, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 60 days.

(21) Appl. No.: 16/640,128

(22) PCT Filed: Dec. 14, 2018

(86) PCT No.: PCT/JP2018/046000
§ 371 (c)(1),
(2) Date: Feb. 19, 2020

(87) PCT Pub. No.: WO2019/131193
PCT Pub. Date: Jul. 4, 2019

(65) Prior Publication Data
US 2021/0159498 A1   May 27, 2021

(30) Foreign Application Priority Data
Dec. 27, 2017 (JP) ................................. 2017-251239

(51) Int. Cl.
| | | |
|---|---|---|
| *H01M 4/58* | (2010.01) | |
| *H01M 50/414* | (2021.01) | |
| *H01M 50/457* | (2021.01) | |
| *H01M 50/46* | (2021.01) | |
| *H01M 10/0525* | (2010.01) | |
| *H01M 50/451* | (2021.01) | |
| *H01M 50/443* | (2021.01) | |
| *H01M 4/02* | (2006.01) | |
| *H01M 50/417* | (2021.01) | |
| *H01M 50/42* | (2021.01) | |
| *H01M 50/426* | (2021.01) | |

(52) U.S. Cl.
CPC ......... *H01M 4/58* (2013.01); *H01M 10/0525* (2013.01); *H01M 50/414* (2021.01); *H01M 50/443* (2021.01); *H01M 50/451* (2021.01); *H01M 50/457* (2021.01); *H01M 50/46* (2021.01); *H01M 50/417* (2021.01); *H01M 50/42* (2021.01); *H01M 50/426* (2021.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 2009/0011337 A1* | 1/2009 | Kajita | ............... | H01M 10/0525 429/249 |
| 2013/0280583 A1 | 10/2013 | Lee et al. | | |
| 2014/0287295 A1 | 9/2014 | Honda et al. | | |
| 2014/0322586 A1* | 10/2014 | Lee | .................... | H01M 50/449 429/144 |
| 2016/0072111 A1* | 3/2016 | Kim | .................... | H01M 50/431 429/144 |
| 2016/0141576 A1 | 5/2016 | Lee et al. | | |
| 2018/0315971 A1* | 11/2018 | Kwon | ................. | H01M 50/417 |

FOREIGN PATENT DOCUMENTS

| | | |
|---|---|---|
| CN | 103814460 A | 5/2014 |
| CN | 104103792 A | 10/2014 |
| CN | 105609688 A | 5/2016 |
| JP | 2013-105521 A | 5/2013 |
| JP | 2015-15096 A | 1/2015 |
| JP | 2016-72120 A | 5/2016 |
| JP | 2017-63041 A | 3/2017 |
| KR | 10-2014-0073957 A | 6/2014 |

OTHER PUBLICATIONS

Machine Translation for KR 2014-0073957 (Year: 2014).*
Machine translation of JP2016-072120, published on May 9, 2016 (Year: 2016).*
International Search Report dated Mar. 12, 2019, issued in counterpart application No. PCT/JP2018/046000 (2 pages).
English Translation of Chinese Search Report dated Dec. 22, 2021, issued in counterpart CN application No. 201880052094.3. (3 pages).

* cited by examiner

*Primary Examiner* — Anca Eoff
(74) *Attorney, Agent, or Firm* — WHDA, LLP (57) ABSTRACT

In a non-aqueous electrolyte secondary battery according to one exemplary embodiment, a separator includes a substrate, a first filler layer containing phosphate particles and formed on at least one surface of the substrate, and a second filler layer containing inorganic particles and formed on a surface of the first filler layer on the side of the at least one surface of the substrate. The phosphate particles have a BET specific surface area of 5 $m^2/g$ or more and 100 $m^2/g$ or less.

5 Claims, 2 Drawing Sheets

NON-AQUEOUS ELECTROLYTE SECONDARY BATTERY

TECHNICAL FIELD

The present disclosure relates to a technique pertaining to non-aqueous electrolyte secondary batteries.

BACKGROUND ART

Non-aqueous electrolyte secondary batteries, such as lithium-ion batteries, may overheat due to overcharging, internal short circuit, external short circuit, excessive resistance heating caused by large current, or the like. In the related art, the shutdown function of separators is known as one of techniques for suppressing heat generation of non-aqueous electrolyte secondary batteries. The shutdown function works such that the separator melts as a result of battery overheating to close the pores of the separator and thus to block the ion conduction between the positive and negative electrodes, whereby suppressing further battery heat generation.

A known separator for non-aqueous electrolyte secondary batteries has a layer containing inorganic particles made of aluminum oxide, boehmite, or the like on the surface of a substrate having a shutdown function (see, for example, Patent Literature 1). Patent Literature 1 describes that the use of a separator satisfying a predetermined structure can suppress an increase in battery internal resistance and can achieve both high capacity and high power.

CITATION LIST

Patent Literature

PTL 1: Japanese Published Unexamined Patent Application No. 2017-63041

SUMMARY OF INVENTION

As described above, it is an important task to suppress battery heat generation by blocking ion conduction between positive and negative electrodes in case of battery overheating. However, conventional techniques including the technique disclosed in Patent Literature 1 may fail to sufficiently block the ion conduction between positive and negative electrodes. In particular, there is room for improvement in suppressing heat generation in the battery nail penetration test.

An object of the present disclosure is to sufficiently block ion conduction between positive and negative electrodes in case of battery overheating to suppress further battery heat generation.

A non-aqueous electrolyte secondary battery in an aspect of the present disclosure includes a positive electrode, a negative electrode, and a separator. The separator includes a substrate, a first filler layer containing phosphate particles and formed on at least one surface of the substrate, and a second filler layer containing inorganic particles having a higher melting point than the phosphate particles and formed on a surface of the first filler layer on the side of the at least one surface of the substrate. The phosphate particles have a BET specific surface area of 5 $m^2/g$ or more and 100 $m^2/g$ or less.

The non-aqueous electrolyte secondary battery in one aspect of the present disclosure makes it possible to sufficiently block ion conduction between positive and negative electrodes in case of battery overheating to suppress further battery heat generation.

DESCRIPTION OF EMBODIMENTS

As described above, a porous resin substrate in a separator has a shutdown function. In case of battery overheating, the shutdown function of the resin substrate thus works so as to block ion conduction between positive and negative electrodes or the like and to suppress further battery heat generation. However, as the capacity and energy density of a battery increases, the battery internal temperature rises to very high temperature (e.g., 200° C. or higher) at the time of abnormality, which may fail to maintain the shape of a separator.

Under such a circumstance, the inventors of the present disclosure have conducted intensive studies and, as a result, have found that the ion conduction between positive and negative electrodes can be sufficiently blocked in case of battery overheating by interposing a first filler layer containing phosphate particles between a substrate of a separator and a second filler layer having high heat resistance. A non-aqueous electrolyte secondary battery according to the present disclosure makes it possible to suppress further battery heat generation in case of battery overheating.

If the non-aqueous electrolyte secondary battery according to the present disclosure overheats due to short circuit or the like, the phosphate particles contained in the first filler layer melt and undergo polymerization with heat and the potential of the positive electrode acting as acceleration factors and fill the pores in the substrate and the second filler layer. At this time, the second filler layer having high heat resistance maintains the shape of the separator. The phosphate that has melted and undergone polymerization strengthens the adhesion between the substrate and the second filler layer and thus suppresses deformation of the separator to provide high shape stability. In the non-aqueous electrolyte secondary battery according to the present disclosure, the phosphate particles that have melted and undergone polymerization fill the pores in the substrate and the second filler layer and provide a sufficient shutdown effect of the substrate itself. This inhibits transfer of lithium ions between the positive and negative electrodes and sufficiently suppresses the exothermic reaction at the time of short circuit.

Unless the first filler layer containing phosphate particles is present between the substrate and the second filler layer (heat-resistant layer), there is no effect of the phosphate particles in strengthening the adhesion between the substrate and the second filler layer at the time of battery overheating. The separator may thus deform and may fail to sufficiently block the ion conduction between the positive and negative electrodes.

It is noted that battery heat generation is accelerated such that, for example, flammable or oxidizing gas (e.g., oxygen, hydrogen) is generated from one electrode as a result of an increase in battery internal temperature due to battery internal short circuit and the gas moves to the other electrode to cause reaction. The non-aqueous electrolyte secondary battery according to the present disclosure makes it possible to sufficiently block the movement of the gas.

Hereinafter, exemplary embodiments will be described in detail. In the following description, a cylindrical battery in which a wound-type electrode body 14 is accommodated in a battery case having a cylindrical shape is illustrated. However, the electrode body is not limited to a wound-type electrode body and may be a stacked-type electrode body in which positive electrodes and negative electrodes are alternately stacked with separators interposed therebetween. The battery case is not limited to a cylindrical shape and may be a metal case having, for example, a prismatic shape (prismatic battery) or a coin shape (coin battery), or a resin case (laminate battery) formed of a resin film. In this specification, the expression "value (A) to value (B)" means value (A) or more and value (B) or less, unless otherwise specified.

Figure 1:
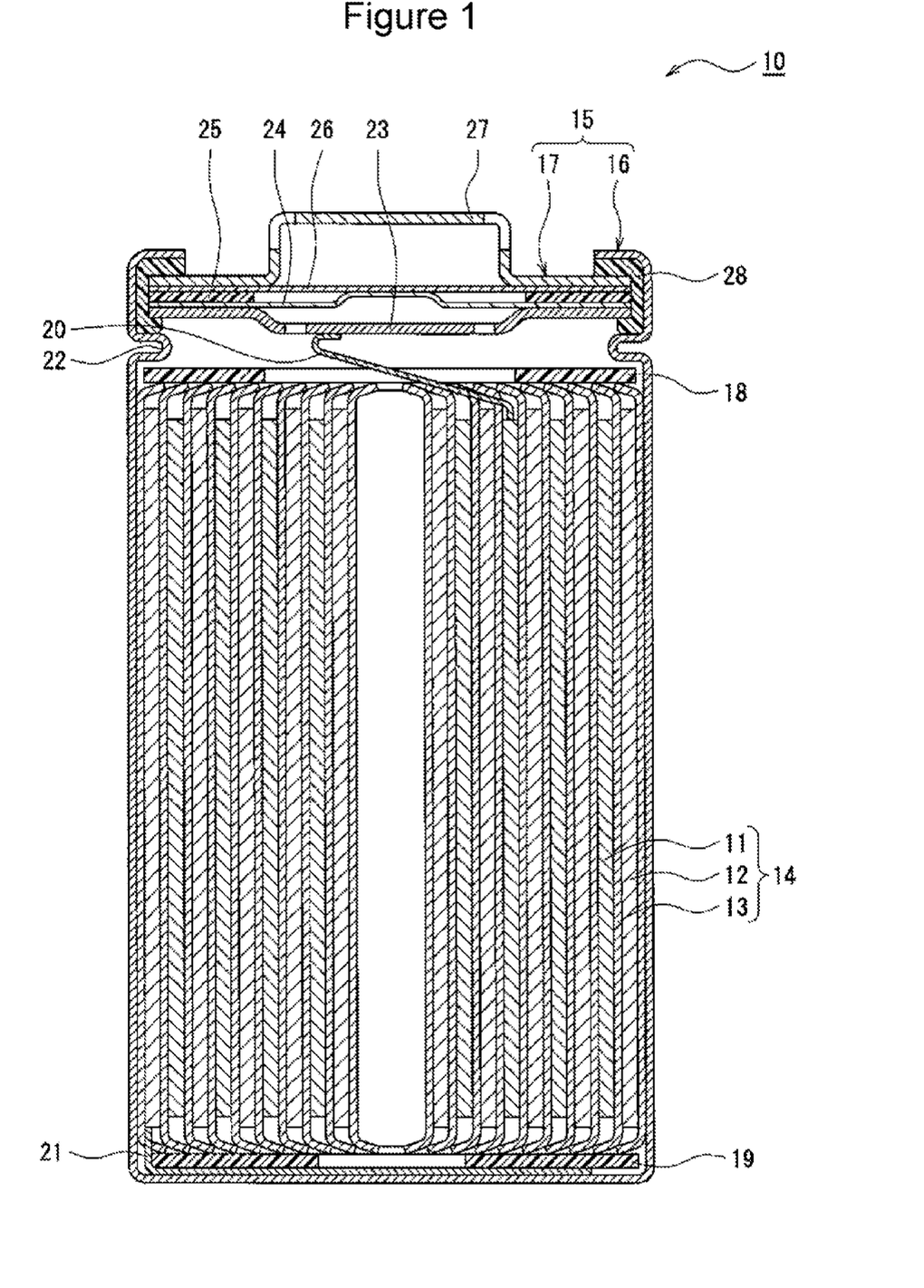
FIG. 1 is a cross-sectional view of a non-aqueous electrolyte secondary battery according to one exemplary embodiment.

FIG. 1 is a cross-sectional view of a non-aqueous electrolyte secondary battery 10 according to one exemplary embodiment. As illustrated in FIG. 1, the non-aqueous electrolyte secondary battery 10 includes an electrode body 14, a non-aqueous electrolyte (not shown), and a battery case 15 accommodating the electrode body 14 and the non-aqueous electrolyte. The electrode body 14 includes a positive electrode 11, a negative electrode 12, and a separator 13 and has a wound structure in which the positive electrode 11 and the negative electrode 12 are wound with the separator 13 interposed therebetween. The battery case 15 includes an outer can 16 having a bottomed cylindrical shape and a sealing body 17 which seals an opening of the outer can 16.

The non-aqueous electrolyte contains a non-aqueous solvent and an electrolyte salt dissolved in the non-aqueous solvent. Examples of the non-aqueous solvent include esters, ethers, nitriles, amides, and solvent mixtures of two or more of these. The non-aqueous solvent may contain a halogenated product formed by substituting at least some of hydrogen atoms of such a solvent with halogen atoms, such as a fluorine atom. The non-aqueous electrolyte is not limited to a liquid electrolyte and may be a solid electrolyte formed by using a gel polymer or the like. For example, a lithium salt, such as $LiPF_6$, is used as an electrolyte salt.

The non-aqueous electrolyte secondary battery 10 includes insulating plates 18 and 19 respectively disposed on the upper and lower sides of the electrode body 14. In the example illustrated in FIG. 1, a positive electrode lead 20 attached to the positive electrode 11 passes through a through-hole of the insulating plate 18 and extends toward the sealing body 17, whereas a negative electrode lead 21 attached to the negative electrode 12 passes outside the insulating plate 19 and extends toward the bottom of the outer can 16. The positive electrode lead 20 is connected to the lower surface of the filter 23, which is a bottom plate of the sealing body 17, by welding or the like. The cap 27 is a top plate of the sealing body 17 electrically connected to the filter 23 and serves as a positive electrode terminal. The negative electrode lead 21 is connected to the bottom inner surface of the outer can 16 by welding or the like. The outer can 16 serves as a negative electrode terminal.

The outer can 16 is, for example, a metal container having a bottomed cylindrical shape. A gasket 28 is disposed between the outer can 16 and the sealing body 17 to ensure sealing of the battery. The outer can 16 has, for example, a protrusion 22 which supports the sealing body 17 and which is formed such that the side surface partially protrudes toward the inside. The protrusion 22 is preferably annularly formed in the circumferential direction of the outer can 16 and supports the sealing body 17 on its upper surface.

The sealing body 17 has a structure in which a filter 23, a lower valve body 24, an insulating member 25, an upper valve body 26, and a cap 27 are stacked in this order from the electrode body 14 side. The members that constitute the sealing body 17 have, for example, a disc shape or ring shape. The members other than the insulating member 25 are electrically connected to one another. The lower valve body 24 and the upper valve body 26 are connected to each other at their center portions, and the insulating member 25 is interposed between the peripheral portions of the lower valve body 24 and the upper valve body 26. When the battery internal pressure rises due to overheating, the lower valve body 24 deforms so as to press the upper valve body 26 toward the cap 27 and fractures. This breaks the electrical connection between the lower valve body 24 and the upper valve body 26. If the internal pressure further increases, the upper valve body 26 fractures, and gas is released through an opening of the cap 27.

Figure 2:
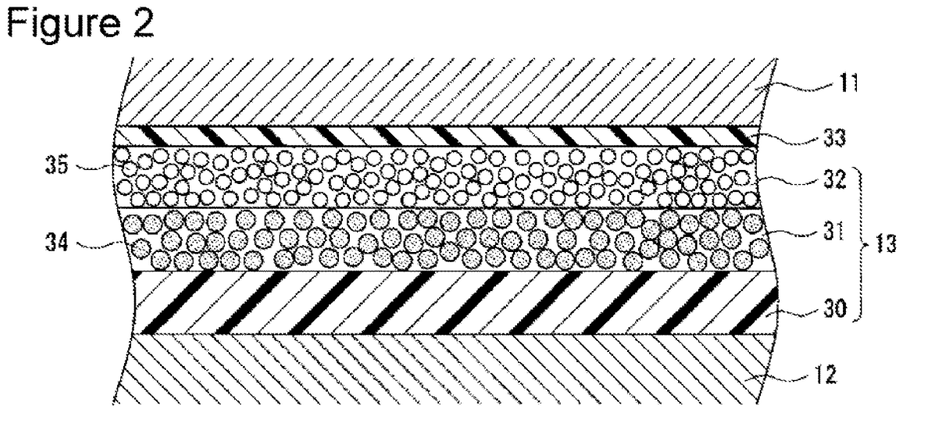
FIG. 2 is a cross-sectional view of an electrode body according to one exemplary embodiment.
Figure 3:
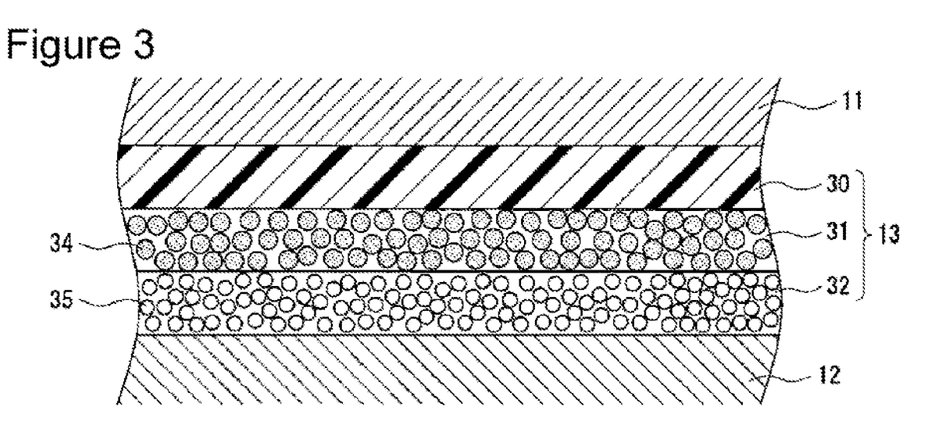
FIG. 3 is a cross-sectional view of an electrode body according to another exemplary embodiment.
Figure 4:
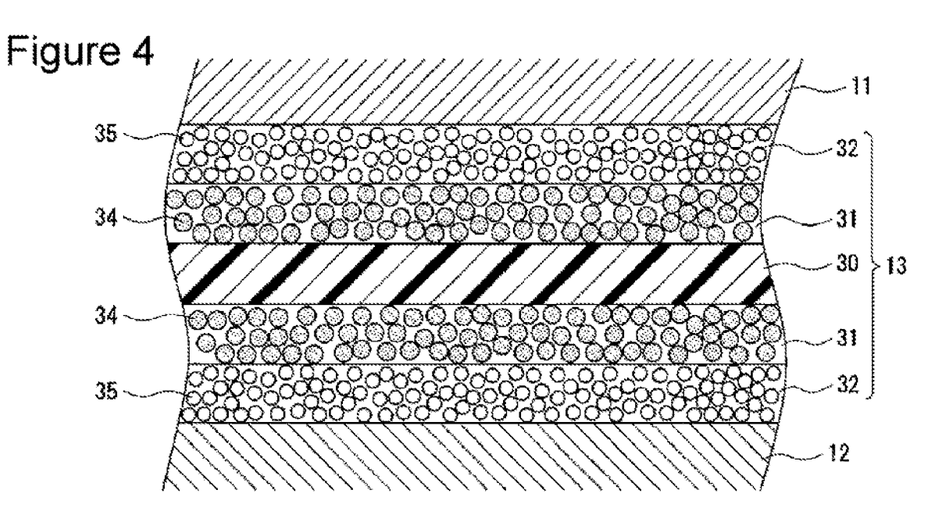
FIG. 4 is a cross-sectional view of an electrode body according to another exemplary embodiment.

The electrode body 14, especially the separator 13, will be described below in detail with reference to FIG. 2 to FIG. 4. FIG. 2 to FIG. 4 are cross-sectional views of the electrode body 14 and especially show a partially enlarged cross section of the separator 13.

[Positive Electrode]

The positive electrode 11 includes a positive electrode current collector and a positive electrode mixture layer formed on the current collector. The positive electrode current collector is, for example, a foil made of a metal, such as aluminum, stable in the potential range of the positive electrode 11 or a film having a surface layer made of the metal. The positive electrode mixture layer preferably contains a positive electrode active material, a conductive material, and a binder and is preferably formed on each surface of the positive electrode current collector. The positive electrode 11 can be produced by applying a positive electrode mixture slurry containing a positive electrode active material, a conductive material, a binder, and the like to the positive electrode current collector, drying the coating films, and then rolling the coating films to form a positive electrode mixture layer on each surface of the positive electrode current collector.

Examples of the positive electrode active material include a lithium metal composite oxide containing a metal element, such as Co, Mn, Ni, or Al. Examples of the lithium metal composite oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M; at least one selected from Na, Mg, Sc, Y, Mn, Fe, Co, Ni, Cu, Zn, Al, Cr, Pb, Sb, and B, $0.95 \leq x \leq 1.2$, $0.8 < y \leq 0.95$, $2.0 \leq z \leq 2.3$).

Examples of the conductive material include carbon materials, such as carbon black, acetylene black, Ketjenblack, graphite, carbon nanotubes, carbon nanofibers, and graphene. Examples of the binder include fluorine-containing resins, such as polytetrafluoroethylene (PTFE), polyvinylidene fluoride (PVdF); and polyacrylonitrile (PAN), polyimides, acrylic resins, and polyolefins. These resins may be used together with carboxymethyl cellulose (CMC) or a salt thereof, polyethylene oxide (PEO), or the like.

[Negative Electrode]

The negative electrode 12 includes a negative electrode current collector and a negative electrode mixture layer formed on the current collector. The negative electrode current collector may be, for example, a foil made of a metal, such as copper, stable in the potential range of the negative electrode 12 or a film having a surface layer made of the metal. The negative electrode mixture layer preferably contains a negative electrode active material and a binder and is preferably formed on each surface of the negative electrode current collector. The negative electrode 12 can be produced by applying a negative electrode mixture slurry containing a negative electrode active material, a binder, and the like to the negative electrode current collector, drying the coating films, and then rolling the coating films to form a negative electrode mixture layer on each surface of the negative electrode current collector.

The negative electrode active material is any active material that can reversibly intercalate and deintercalate lithium ions. Examples of the negative electrode active material include carbon materials, such as natural graphite and synthetic graphite, metals, such as silicon (Si) and tin (Sn), to be alloyed with Li, and oxides containing a metal element, such as Si or Sn. The negative electrode mixture layer may contain a lithium-titanium composite oxide. The lithium-titanium composite oxide functions as a negative electrode active material. When the lithium-titanium composite oxide is used, a conductive material, such as carbon black, is preferably added to the negative electrode mixture layer.

Examples of the binder contained in the negative electrode mixture layer include fluorine-containing resins, such as PTFE and PVdF; PAN, polyimides, acrylic resins, and polyolefins, which are the same as those for the positive electrode 11. When the negative electrode mixture slurry is prepared by using an aqueous solvent, CMC or a salt thereof, styrene-butadiene rubber (SBR), polyacrylic acid (PAA) or a salt thereof, polyvinyl alcohol (PVA), or the like can be used as a binder.

[Separator]

As illustrated in FIG. 2, the separator 13 includes a substrate 30, a first filler layer 31 formed on at least one surface of the substrate 30, and a second filler layer 32 formed on a surface of the first filler layer 31 on the side of the at least one surface of the substrate 30. The first filler layer 31 is a layer containing phosphate particles 34. The second filler layer 32 is a heat-resistant layer containing inorganic particles 35 having a higher melting point than the phosphate particles 34 and is formed on a surface of the first filler layer 31 away from the substrate 30. In other words, the separator 13 has a layered structure in which the first filler layer 31 is disposed between the substrate 30 and the second filler layer 32.

If the non-aqueous electrolyte secondary battery 10 overheats due to short circuit or the like, the phosphate particles 34 in the first filler layer 31 melt and undergo polymerization and fill the pores in the substrate 30 and the second filler layer 32 to improve the adhesion between the substrate 30 and the second filler layer 32. This configuration suppresses the deformation of the separator 13 to provide high shape stability and can sufficiently block the ion conduction between the positive and negative electrodes.

In the example illustrated in FIG. 2, the first filler layer 31 and the second filler layer 32 are formed on only one surface of the substrate 30, and the separator 13 is disposed between the positive electrode 11 and the negative electrode 12 with the one surface of the substrate 30 facing the positive electrode 11. By disposing the first filler layer 31 adjacent to the positive electrode 11, for example, the polymerization of the phosphate particles 34 is accelerated. The separator 13 has a resin layer 33 formed on a surface of the second filler layer 32 away from the first filler layer 31. In other words, the resin layer 33 is interposed between the positive electrode 11 and the second filler layer 32. The resin layer 33 has a function of ensuring the adhesion between the positive electrode 11 and the second filler layer 32 in case of battery overheating.

As illustrated in FIG. 3, the separator 13 may have the first filler layer 31 and the second filler layer 32 on only a surface of the substrate 30 that faces the negative electrode 12. In other words, the separator 13 may be disposed between the positive electrode 11 and the negative electrode 12 while a surface of the substrate 30 that has the first filler layer 31 and the second filler layer 32 faces the negative electrode 12. Alternatively, as illustrated in FIG. 4, the first filler layer 31 and the second filler layer 32 may be formed on each surface of the substrate 30. The forms illustrated in FIG. 3 and FIG. 4 lack the resin layer 33. However, for example, in this form, the resin layer 33 may be disposed between the positive electrode 11 and the second filler layer 32.

In the examples illustrated in FIG. 3 and FIG. 4, the separator 13 has a layered structure in which the first filler layer 31 is interposed between the substrate 30 and the second filler layer 32. In the form illustrated in FIG. 3, the substrate 30 and the second filler layer 32 are respectively in contact with the surface of the positive electrode 11 and the surface of the negative electrode 12. In the form illustrated in FIG. 4, the second filler layer 32 is in contact with the surface of the positive electrode 11, and the second filler layer 32 is in contact with the surface of the negative electrode 12.

The first filler layer 31 is disposed on at least one surface of the substrate 30 and interposed between the substrate 30 and the second filler layer 32. For example, among the filler layers, only the first filler layer 31 may be formed on the other surface of the substrate 30 or only the second filler layer 32 may be formed on the other surface of the substrate 30. Alternatively, as illustrated in FIG. 2 and FIG. 3, no filler layer may be formed on the other surface of the substrate 30.

In FIG. 2 to FIG. 4, the interface between the first filler layer 31 and the second filler layer 32 is clearly illustrated, but the interface may not be clear. For example, a layer in which the phosphate particles 34 and the inorganic particles 35 are mixed may be present adjacent to the interface between the first filler layer 31 and the second filler layer 32. In the mixed layer, the amount of the phosphate particles 34 relative to the inorganic particles 35 increases toward the substrate 30, and the amount of the inorganic particles 35 relative to the phosphate particles 34 increases away from the substrate 30. For example, no inorganic particles 35 are present adjacent to the interface between the first filler layer 31 and the substrate 30, whereas no phosphate particles 34 are present adjacent to a surface of the second filler layer 32 away from the substrate 30.

(Substrate)

The substrate 30 is formed of, for example, an insulating porous sheet having ion permeability, such as a microporous thin film, a woven fabric, or a non-woven fabric. Examples of the resin that forms the substrate 30 include polyolefins, such as polyethylene, polypropylene, a copolymer of polyethylene and an α-olefin; and acrylic resin, polystyrene, polyester, and cellulose. The substrate 30 may have a monolayer structure or a multilayer structure. The thickness of the substrate 30 is preferably, but not necessarily, for example, 3 μm or more and 20 μm or less.

To ensure ion conductivity during charging and discharging of the battery, the porosity of the substrate 30 is preferably, for example, 30% or more and 70% or less. The porosity of the substrate 30 is determined by the following method.

(1) The substrate 30 is punched out at 10 positions into a circular shape with a diameter of 2 cm, and the center thickness h and the mass w of the punched-out piece of the substrate 30 are measured.

(2) The total volume V and the total mass W of 10 punched-out pieces are obtained from the thickness h and the mass w, and the porosity s is calculated in accordance with the following formula.

Porosity $\varepsilon(\%) = ((\rho V - W)/(\rho V)) \times 100$

ρ: density of material of substrate

The average pore size of the substrate 30 is, for example, from 0.02 µm to 5 µm, and preferably from 0.05 µm to 1 µm. The average pore size of the substrate 30 is determined by using, for example, Perm-Porometer (available from Seika Corporation) which enables measurements of pore sizes on the basis of the bubble point method (JIS K 3832, ASTM F316-86).

(First Filler Layer)

The first filler layer 31 is a porous layer that contains the phosphate particles 34 and in which pores through which lithium ions pass are formed in gaps between the phosphate particles 34. For example, if the battery in a charged state overheats, the phosphate particles 34 contained in the first filler layer 31 melt and undergo polymerization with heat and the potential of the positive electrode 11 acting as acceleration factors and fill the pores in the substrate 30 and the second filler layer 32 to block the ion conduction between the positive and negative electrodes. In addition, the substrate 30 itself melts to close the pores. At this time, the phosphate particles 34 that have melted and undergone polymerization strengthen the adhesion between the substrate 30 and the second filler layer 32 and thus further suppress deformation of the separator 13, which improves the function of blocking the ion conduction between the positive and negative electrodes.

To ensure, for example, high physical strength and good ion conductivity during charging and discharging of the battery, the porosity of the first filler layer 31 is preferably, for example, 30% or more and 70% or less. The porosity of the first filler layer 31 is calculated in accordance with the following formula (the same applies to the second filler layer 32).

Porosity (%) of first filler layer=100−[[$W/(d \times \rho)$]×100]

W: basis weight (g/cm$^2$) of first filler layer
d: thickness (cm) of first filler layer
ρ: average density (g/cm$^3$) of first filler layer Examples of the phosphate particles 34 include particles made of $Li_2PO_4$, LiPON, $Li_2HPO_4$, $LiH_2PO_4$, $Na_3PO_4$, $Na_2HPO_4$, $NaH_2PO_4$, $Zr_3(PO_4)_4$, $Zr(HPO_4)_2$, $HZr_2(PO_4)_3$, $K_3PO_4$, $K_2HPO_4$, $KH_2PO_4$, $Ca_3(PO_4)_2$, $CaHPO_4$, $Mg_3(PO_4)_2$, and $MgHPO_4$. Among these, at least one selected from lithium phosphate ($Li_3PO_4$), dilithium hydrogen phosphate ($Li_2HPO_4$), and lithium dihydrogen phosphate ($LiH_2PO_4$) is preferred in order to, for example, prevent side reactions.

In general, the phosphate particles 34 preferably melt at a temperature of about 140° C. to 190° C. in consideration of, for example, the temperature during battery manufacture, the battery internal temperature in ordinary use, and the battery internal temperature in the event of abnormality.

The BET specific surface area of the phosphate particles 34 is preferably 5 m$^2$/g or more and 100 m$^2$/g or less, and more preferably 20 m$^2$/g or more and 100 m$^2$/g or less. The BET specific surface area is determined in accordance with the BET method (nitrogen adsorption method) described in JIS R 1626. Since the phosphate particles 34 having a BET specific surface area in the above range easily melt at a temperature of about 140° C. to 190° C., the use of such particles allows the phosphate particles 34 that have melted and undergone polymerization to readily enter the pores in the substrate 30 and the second filler layer 32 in case of battery overheating.

The average particle size of the phosphate particles 34 is, for example, 0.05 µm or more and 2 µm or less. If the average particle size of the phosphate particles 34 does not satisfy the above range, the amount of heat generated at the time of battery abnormality may be larger than that in the case where the average particle size satisfies the above range. The average particle size refers to a volume-average particle size determined by laser diffraction analysis and means a median diameter (also referred to as 50% particle size) at 50% of the cumulative volume in the particle size distribution. The average particle size is determined by using a laser diffraction/scattering particle size distribution analyzer (available from Horiba Ltd.). In this specification, the term "average particle size" means a median diameter, unless otherwise specified.

The average particle size of the phosphate particles 34 is preferably from 0.05 µm to 1 µm and smaller than the average pore size of the substrate 30. When the phosphate particles 34 having an average particle size smaller than the average pore size of the substrate 30 are used, the phosphate particles 34 partially enter the pores of the substrate 30, which makes it easy to close the pores of the substrate 30 at the time of occurrence of short circuit. The depth to which the phosphate particles 34 enter the pores of the substrate 30 is preferably 0.1 µm or more and 1 µm or less in the thickness direction of the substrate 30.

The first filler layer 31 contains a binder, which bonds the phosphate particles 34 to each other. Examples of the binder include polyolefins, such as polyethylene, polypropylene, and a copolymer of polyethylene and an α-olefin; fluorine-containing resins, such as PVdF, PTFE, polyvinyl fluoride (PVF); fluorine-containing rubbers, such as vinylidene fluoride-hexafluoropropylene-tetrafluoroethylene copolymer and ethylene-tetrafluoroethylene copolymer; and styrene-butadiene copolymer and a hydride thereof, acrylonitrile-butadiene copolymer and a hydride thereof, acrylonitrile-butadiene-styrene copolymer and a hydride thereof, methacrylic acid ester-acrylic acid ester copolymer, styrene-acrylic acid ester copolymer, acrylonitrile-acrylic acid ester copolymer, polyvinyl acetate, polyphenylene ether, polysulfone, polyether sulfone, polyphenylene sulfide, polyetherimide, polyamideimide, polyamide, poly-N-vinylacetamide, polyester, polyacrylonitrile, cellulose, ethylene-vinyl acetate copolymer, polyvinyl chloride, isoprene rubber, butadiene rubber, polymethyl acrylate, polyethyl acrylate, polyvinyl alcohol, CMC, acrylamide, PVA, methyl cellulose, guar gum, sodium alginate, carrageenan, xanthan gum, and salts thereof.

The amount of the phosphate particles 34 is preferably 90 mass % or more, and more preferably 92 mass % or more and 98 mass or less relative to the total mass of the first filler layer 31. In this case, the phosphate particles 34 that have melted and undergone polymerization at the time of battery overheating enter the pores in the substrate 30 and the second filler layer 32 to some extend to close the pores and improve the adhesion between the substrate 30 and the second filler layer 32. The amount of the binder in the first filler layer 31 is, for example, 2 mass- or more and 8 mass % or less.

The thickness of the first filler layer 31 is preferably, but not necessarily, 1 μm or more and 10 μm or less, more preferably 1 μm or more and 5 μm or less, and still more preferably 2 μm or more and 4 μm or less. To reduce the amount of heat generated from the battery, the thickness of the first filler layer 31 is preferably 2 or more and 40 or less times the average particle size of the phosphate particles 34, and more preferably 3 or more and 20 or less times the average particle size of the phosphate particles 34.

The first filler layer 31 may further contain heteropoly acid. The addition of heteropoly acid may accelerate polycondensation of the melted phosphate. Examples of heteropoly acids include phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolibdic acid, silicomolybdotungstic acid, and silicomolybdotungstovanadic acid.

(Second Filler Layer)

The second filler layer 32 is a porous layer that contains the inorganic particles 35 having higher heat resistance than the phosphate particles 34 and in which pores through which lithium ions pass are formed in gaps between the inorganic particles 35. The porosity of the second filler layer 32 is preferably 30% or more and 70% or less, like the first filler layer 31. The second filler layer 32 has a function of improving the shape stability of the separator 13 by suppressing large deformation of the substrate 30 caused as a result of battery overheating. The provision of the second filler layer 32 which is a heat-resistant layer improves the shutdown effect of the separator 13 and sufficiently suppresses the exothermic reaction at the time of short circuit.

The inorganic particles 35 are particles having, for example, a higher melting point or thermal decomposition temperature than the phosphate particles 34 contained in the first filler layer 31. The inorganic particles 35 are preferably formed of an insulating inorganic compound that does not melt or decompose at the time of battery overheating. Examples of the inorganic particles 35 include particles made of metal oxides, metal oxide hydrates, metal hydroxides, metal nitrides, metal carbides, metal sulfides, and the like. The average particle size of the inorganic particles 35 is preferably, for example, 0.2 μm or more and 2 μm or less. If the average particle size does not satisfy the above range, the amount of heat generated at the time of overheating may be larger than that in the case where the average particle size satisfies the above range.

Examples of metal oxides and metal oxide hydrates include aluminum oxide, boehmite ($Al_2O_3H_2O$ or $AlOOH$), magnesium oxide, titanium oxide, zirconium oxide, silicon oxide, yttrium oxide, and zinc oxide. Examples of metal nitrides include silicon nitride, aluminum nitride, boron nitride, and titanium nitride. Examples of metal carbides include silicon carbide and boron carbide. Examples of metal sulfides include barium sulfate. Examples of metal hydroxides include aluminum hydroxide. In the present invention, the melting point of a substance, such as boehmite which melts after conversion into alumina, refers to the melting point of the substance after conversion.

The inorganic particles 35 may be particles made of, for example, a porous aluminosilicate, such as zeolite ($M_{2/n}O \cdot Al_2O_3 \cdot xSiO_2 \cdot yH_2O$, M is a metal element, $x \geq 2$, $y \geq 0$), a layered silicate, such as talc ($Mg_3Si_4O_{10}(OH)_2$), or barium titanate ($BaTiO_3$), or strontium titanate ($SrTiO_3$). Among these, at least one selected from aluminum oxide, boehmite, talc, titanium oxide, and magnesium oxide is preferred in view of, for example, insulation and heat resistance.

The second filler layer 32 contains a binder, which bonds the inorganic particles 35 to each other. The same resin as that used in the first filler layer 31 can be used as a binder. The amount of the inorganic particles 35 is preferably 90 mass' or more, and more preferably 92 mass' or more and 98 mass' or less relative to the total mass of the second filler layer 32. The amount of the binder in the second filler layer 32 is, for example, 2 mass % or more and 8 mass or less. The thickness of the second filler layer 32 is preferably, but not necessarily, 1 μm or more and 5 μm or less, and more preferably 2 μm or more and 4 μm or less.

(Resin Layer)

In the example illustrated in FIG. 2, the resin layer 33 formed on the surface of the second filler layer 32 is in contact with the surface of the positive electrode 11. The provision of the resin layer 33 ensures good contact state between the positive electrode 11 and the separator 13 even if, for example, the positive electrode 11 is deformed by an increase in battery temperature. This configuration makes it easy to uniformly cause the melting and polymerization reaction of the phosphate particles 34. The resin layer 33 is formed of a resin that melts or softens when the electrode body is formed by hot pressing and/or the battery in a charged state overheats.

The resin layer 33 may be adhered to the surface of the positive electrode 11 by hot press forming in producing the electrode body. Alternatively, the resin layer 33 may not have adhesion to the surface of the positive electrode 11 during ordinary use of the battery and may exhibit this adhesion in case of overheating. The resin layer 33 is formed of, for example, a resin having a glass transition temperature of 130° C. or lower. The resin layer 33 may be formed of, for example, a resin for the binder used in the mixture layers of the electrodes. Examples of suitable resins include fluorine-containing resins, such as PTFE and PVdF; and PAN, acrylic resins, and polyolefins.

The thickness of the resin layer 33 is preferably, but not necessarily, 5 μm or less, more preferably 0.5 μm or more and 5 μm or less, and still more preferably 1 μm or more and 3 μm or less. The resin layer 33 having a thickness in this range does not affect, for example, the charging/discharging characteristics of the battery and the battery capacity and makes it easy to ensure good contact state between the positive electrode 11 and the separator 13 even if the positive electrode 11 deforms at the time of abnormality.

The separator 13 having a layered structure including the resin layer 33/the second filler layer 32/the first filler layer 31/the substrate 30 is manufactured by forming the first filler layer 31, the second filler layer 32, and the resin layer 33 in this order on one surface of the porous resin substrate 30. The first filler layer 31 can be formed by preparing a slurry composition containing the phosphate particles 34, a binder, and a dispersion medium, applying the composition to one surface of the substrate 30, and drying the coating film. The second filler layer 32 can be formed by preparing a slurry composition containing the inorganic particles 35, a binder, and a dispersion medium, applying the composition to the surface of the first filler layer 31, and drying the coating film. The resin layer 33 can be formed by applying a resin solution to the surface of the second filler layer 32, and drying the coating film.

The separator 13 has a structure in which the first filler layer 31 and the second filler layer 32 are stacked in this order on at least one surface of the substrate 30, as described above. The first filler layer 31 and the second filler layer 32 may be formed on both surfaces of the substrate 30, but are preferably formed on only one surface of the substrate 30, especially only a surface of the substrate 30 that faces the positive electrode 11, in view of high capacity or the like. The melting and polymerization of the phosphate particles 34 contained in the first filler layer 31 are induced not only by the heat at the time of battery abnormality but also by the potential of the positive electrode 11. Accordingly, the first filler layer 31 is preferably positioned adjacent to the positive electrode 11.

EXAMPLES

The present disclosure will be further described below by way of Examples, but the present disclosure is not limited to these Examples.

Example 1

[Production of Separator]

A separator having a layered structure including a second filler layer containing boehmite particles/a first filler layer containing phosphate particles/a porous substrate made of polyethylene/a first filler layer containing phosphate particles/a second filler layer containing boehmite particles was produced according to the following procedure.
(1) A first slurry composition having a solids content of 15 masse was prepared by mixing lithium phosphate particles ($Li_3PO_4$) having a BET specific surface area of 54.07 m$^2$/g and an average particle size of 0.93 μm and poly-N-vinylacetamide at a mass ratio of 100:6.5, and adding NMP to the resulting mixture.
(2) A second slurry composition having a solids content of 15 mass % was prepared by mixing boehmite particles and poly-N-vinylacetamide at a mass ratio of 100:6.5, and adding N-methyl-2-pyrrolidone (NMP) to the resulting mixture.
(3) First filler layers were formed by applying the first slurry composition to each surface of a 12-μm-thick monolayer porous substrate made of polyethylene by means of gravure coating such that the layer thickness after drying was 4 μm, and drying the coating films.
(4) Second filler layers were formed by applying the second slurry composition to a surface of each first filler layer by means of gravure coating such that the layer thickness after drying was 4 μm, and drying the coating films.

[Production of Positive Electrode]

Particles having an average secondary particle size of about 15 μm and made of a lithium-nickel-cobalt-aluminum composite oxide represented by $Li_{1.05}Ni_{0.82}Co_{0.15}Al_{0.03}O_2$ were used as positive electrode active material particles. A positive electrode mixture slurry was prepared by mixing the positive electrode active material, carbon black, and PVdF at a mass ratio of 100:1:1, and adding N-methyl-2-pyrrolidone to the resulting mixture. Next, the positive electrode mixture slurry was applied to each surface of a positive electrode current collector formed of aluminum foil, and the coating films were dried and then rolled with a rolling roller. Accordingly, a positive electrode in which the positive electrode mixture layer was formed on each surface of the positive electrode current collector was produced. Exposed sections where the surface of the positive electrode current collector was exposed due to the absence of the positive electrode mixture layer were provided in part of the positive electrode.

[Production of Negative Electrode]

A negative electrode mixture slurry was prepared by mixing synthetic graphite, $SiO_x$ (x=1) having a carbon coating layer, CMC-Na (sodium carboxymethyl cellulose), and a dispersion of SBR (styrene-butadiene rubber) at a mass ratio of 92:8:1:1 in water. Next, the negative electrode mixture slurry was applied to each surface of a negative electrode current collector formed of copper foil, and the coating films were dried and then rolled with a rolling roller. Accordingly, a negative electrode in which the negative electrode mixture layer was formed on each surface of the negative electrode current collector was produced. Exposed sections where the surface of the negative electrode current collector was exposed due to the absence of the negative electrode mixture layer were provided in part of the negative electrode.

[Production of Non-Aqueous Electrolyte]

Lithium hexafluorophosphate ($LiPF_6$) was dissolved at a concentration of 1.0 mol/L in a solvent mixture formed by mixing ethylene carbonate (EC), ethyl methyl carbonate (EMC), and dimethyl carbonate (DMC) at a volume ratio of 3:3:4. In addition, a non-aqueous electrolyte was prepared by dissolving vinylene carbonate (VC) at a concentration of 1.0 mass % in the above solvent mixture.

[Production of Battery]

A stacked-type electrode body was produced by stacking the positive electrodes and the negative electrodes with the separators interposed therebetween, welding an aluminum positive electrode lead to the layered exposed sections of the positive electrode, and welding a nickel negative electrode lead to the layered exposed sections of the negative electrode. The electrode body was accommodated in a battery outer body formed of an aluminum laminate sheet, and the non-aqueous electrolyte was injected into the battery outer body. The outer body was then sealed to produce a 650 mAh non-aqueous electrolyte secondary battery.

[Nail Penetration Test]

In a 25° C. environment, the produced battery was charged at a constant current of 0.3 It until the battery voltage reached 4.2 V, and then charged at a constant voltage of 4.2 V until the current reached 0.05 It, whereby the battery was brought into a charged state. In a 25° C. environment, the tip of a φ3 mm wire nail was vertically penetrated into a central portion of a side surface of the battery in a charged state at a rate of 10 mm/sec. The wire nail penetration was stopped at the time when the wire nail completely penetrated through the battery. The maximum attainable temperature at the battery side surface 5 mm away from a place of the battery side surface where the nail was penetrated was measured. This nail penetration test can simulate overheating of the battery caused by internal short circuit.

Example 2

In separator production, no first filler layer was formed on a surface of the substrate that faces the negative electrode. Otherwise, a battery was produced in the same manner as in Example 1 and subjected to the nail penetration test.

Example 3

In separator production, no first filler layer was formed on a surface of the substrate that faces the positive electrode. Otherwise, a battery was produced in the same manner as in Example 1 and subjected to the nail penetration test.

Example 4

In separator production, no second filler layer was formed on a surface of the substrate that faces the negative electrode. Otherwise, a battery was produced in the same manner as in Example 1 and subjected to the nail penetration test.

Example 5

In separator production, no second filler layer was formed on a surface of the substrate that faces the positive electrode. Otherwise, a battery was produced in the same manner as in Example 1 and subjected to the nail penetration test.

Example 6

In separator production, no first filler layer or second filler layer was formed on a surface of the substrate that faces the negative electrode. Otherwise, a battery was produced in the same manner as in Example 1 and subjected to the nail penetration test.

Example 7

In separator production, no first filler layer or second filler layer was formed on a surface of the substrate that faces the positive electrode. Otherwise, a battery was produced in the same manner as in Example 1 and subjected to the nail penetration test.

Comparative Example 1

In separator production, the lithium phosphate particles used in Example 1 were changed to lithium phosphate particles ($Li_3PO_4$) having a BET specific surface area of 3.65 $m^2$/g and an average particle size of 1.60 μm. Otherwise, a battery was produced in the same manner as in Example 1 and subjected to the nail penetration test.

Comparative Example 2

In separator production, no first filler layer was formed on each surface of the substrate. Otherwise, a battery was produced in the same manner as in Example 1 and subjected to the nail penetration test.

Comparative Example 3

In separator production, no first filler layer was formed on each surface of the substrate and no second filler layer was formed on a surface of the substrate that faces the negative electrode. Otherwise, a battery was produced in the same manner as in Example 1 and subjected to the nail penetration test.

Comparative Example 4

In separator production, no first filler layer was formed on each surface of the substrate, and no second filler layer was formed on a surface of the substrate that faces the positive electrode. Otherwise, a battery was produced in the same manner as in Example 1 and subjected to the nail penetration test.

Comparative Example 5

In separator production, no first filler layer or second filler layer was formed. Otherwise, a battery was produced in the same manner as in Example 1 and subjected to the nail penetration test.

TABLE 1

| | Between Positive Electrode and Substrate | | Between Negative Electrode and Substrate | | Phosphate Particles | Maximum |
| --- | --- | --- | --- | --- | --- | --- |
| | Second Filler Layer | First Filler Layer | First Filler Layer | Second Filler Layer | BET Specific Surface Area | Attainable Temperature |
| Example 1 | present | present | present | present | 54.07 $m^2$/g | 427° C. |
| Example 2 | present | present | — | present | 54.07 $m^2$/g | 435° C. |
| Example 3 | present | — | present | present | 54.07 $m^2$/g | 450° C. |
| Example 4 | present | present | present | — | 54.07 $m^2$/g | 430° C. |
| Example 5 | — | present | present | present | 54.07 $m^2$/g | 442° C. |
| Example 6 | present | present | — | — | 54.07 $m^2$/g | 439° C. |
| Example 7 | — | — | present | present | 54.07 $m^2$/g | 456° C. |
| Comparative Example 1 | present | present | present | present | 3.65 $m^2$/g | 471° C. |
| Comparative Example 2 | present | — | — | present | 54.07 $m^2$/g | 485° C. |
| Comparative Example 3 | present | — | — | — | 54.07 $m^2$/g | 489° C. |
| Comparative Example 4 | — | — | — | present | 54.07 $m^2$/g | 490° C. |
| Comparative Example 5 | — | — | — | — | 54.07 $m^2$/g | 506° C. |

Table 1 indicates that all of batteries using the separators of Examples show much lower maximum attainable temperatures than batteries using the separators of Comparative Examples in the nail penetration test.

REFERENCE SIGNS LIST

10 Non-aqueous electrolyte secondary battery
11 Positive electrode
12 Negative electrode
13 Separator
14 Electrode body
15 Battery case
16 Outer can
17 Sealing body
18, 19 Insulating plate
20 Positive electrode lead
21 Negative electrode lead
22 Protrusion
23 Filter
24 Lower valve body
25 Insulating member
26 Upper valve body
27 Cap
28 Gasket
30 Substrate
31 First filler layer
32 Second filler layer
33 Resin layer
34 Phosphate particles
35 Inorganic particles

The invention claimed is:

1. A non-aqueous electrolyte secondary battery comprising: a positive electrode, a negative electrode, and a separator, wherein the separator includes:
a substrate;
a first filler layer containing phosphate particles and formed on at least one surface of the substrate; and
a second filler layer containing inorganic particles having a higher melting point than the phosphate particles and formed on a surface of the first filler layer on a side of the at least one surface of the substrate, and
wherein the phosphate particles have a BET specific surface area of 5 $m^2/g$ or more and 100 $m^2/g$ or less, and
wherein an average particle size of the phosphate particles is from 0.05 μm to 1 μm, and an average pore size of the substrate is from 0.05 μm to 1 μm, wherein the average particle size of the phosphate particles is smaller than the average pore size of the substrate.

2. The non-aqueous electrolyte secondary battery according to claim 1,
wherein the first filler layer and the second filler layer are formed on only one surface of the substrate, and
wherein the separator is disposed between the positive electrode and the negative electrode with the one surface of the substrate facing the positive electrode.

3. The non-aqueous electrolyte secondary battery according to claim 1, wherein the phosphate particles have a BET specific surface area of 20 $m^2/g$ or more and 100 $m^2/g$ or less.

4. The non-aqueous electrolyte secondary battery according to claim 1, wherein the phosphate particles comprise at least one selected from lithium phosphate, dilithium hydrogen phosphate, and lithium dihydrogen phosphate.

5. The non-aqueous electrolyte secondary battery according to claim 1, wherein the separator further includes a resin layer formed on a surface of the second filler layer away from the first filler layer.

* * * * *